United States Patent
Ahmed et al.

(10) Patent No.: US 9,513,908 B2
(45) Date of Patent: Dec. 6, 2016

(54) STREAMING MEMORY TRANSPOSE OPERATIONS

(71) Applicants: Ashraf Ahmed, Austin, TX (US); Nicholas Todd Humphries, Austin, TX (US); Marc Michael Augustin, Austin, TX (US)

(72) Inventors: Ashraf Ahmed, Austin, TX (US); Nicholas Todd Humphries, Austin, TX (US); Marc Michael Augustin, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 546 days.

(21) Appl. No.: 14/017,238

(22) Filed: Sep. 3, 2013

(65) Prior Publication Data
US 2014/0331032 A1 Nov. 6, 2014

Related U.S. Application Data

(60) Provisional application No. 61/819,454, filed on May 3, 2013.

(51) Int. Cl.
*G06F 5/00* (2006.01)
*G06F 9/30* (2006.01)

(52) U.S. Cl.
CPC ......... *G06F 9/30043* (2013.01); *G06F 9/3017* (2013.01); *G06F 9/30032* (2013.01); *G06F 9/30036* (2013.01)

(58) Field of Classification Search
CPC ....................................................... G06F 12/00
See application file for complete search history.

(56) References Cited

U.S. PATENT DOCUMENTS

| 6,957,317 | B2 * | 10/2005 | Chen ......................... G06T 1/60 711/118 |
| 2009/0016450 | A1 * | 1/2009 | Wang ..................... H04N 19/61 375/240.29 |
| 2010/0321579 | A1 | 12/2010 | Ahmad et al. |
| 2011/0314253 | A1 | 12/2011 | Yaakov |

* cited by examiner

*Primary Examiner* — Cheng-Yuan Tseng
(74) *Attorney, Agent, or Firm* — Renaissance IP Law Group LLP

(57) ABSTRACT

According to one general aspect, an apparatus may include a load/store unit, an execution unit, and a first and a second data path. The load/store unit may be configured to load/store data from/to a memory and transmit the data to/from an execution unit, wherein the data includes a plurality of elements. The execution unit may be configured to perform an operation upon the data. The load/store unit may be configured to transmit the data to/from the execution unit via either a first data path configured to communicate, without transposition, the data between the load/store unit and the execution unit, or a second data path configured to communicate, with transposition, the data between the load/store unit and the execution unit, wherein transposition includes dynamically distributing portions of the data amongst a plurality of elements according to an instruction.

12 Claims, 11 Drawing Sheets

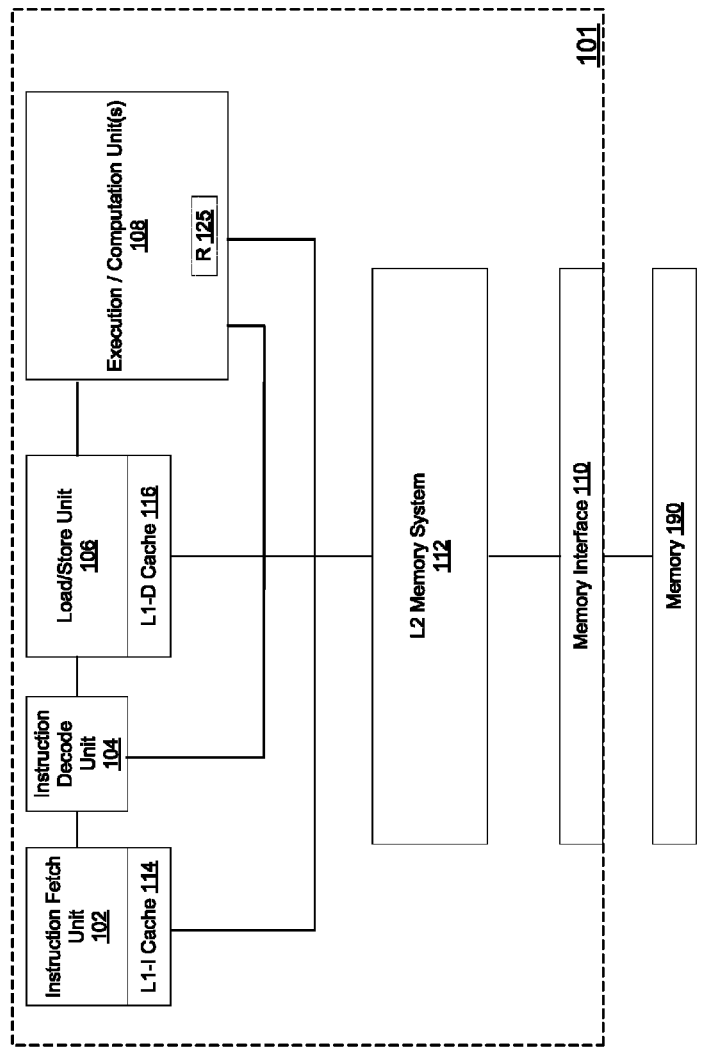

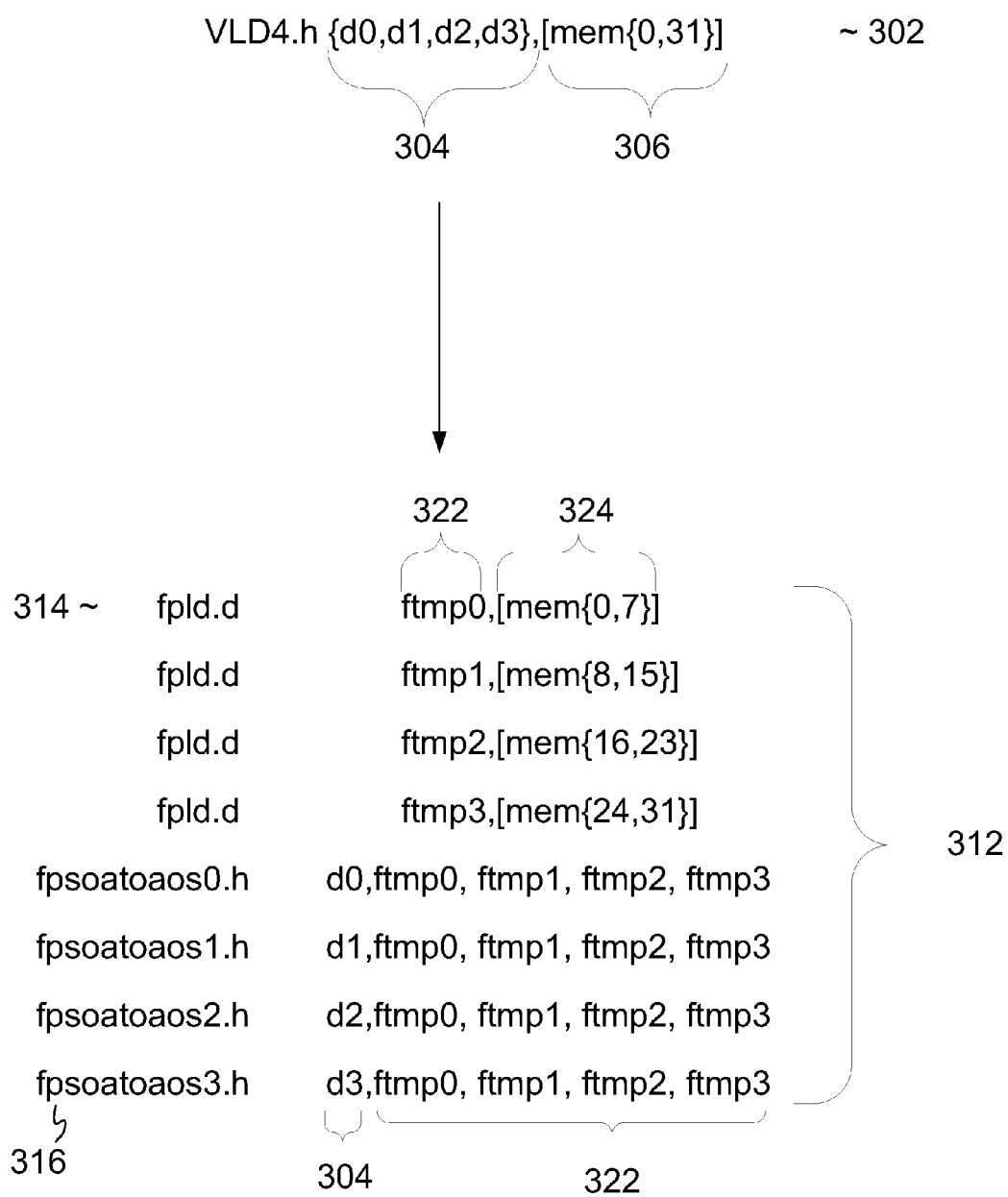

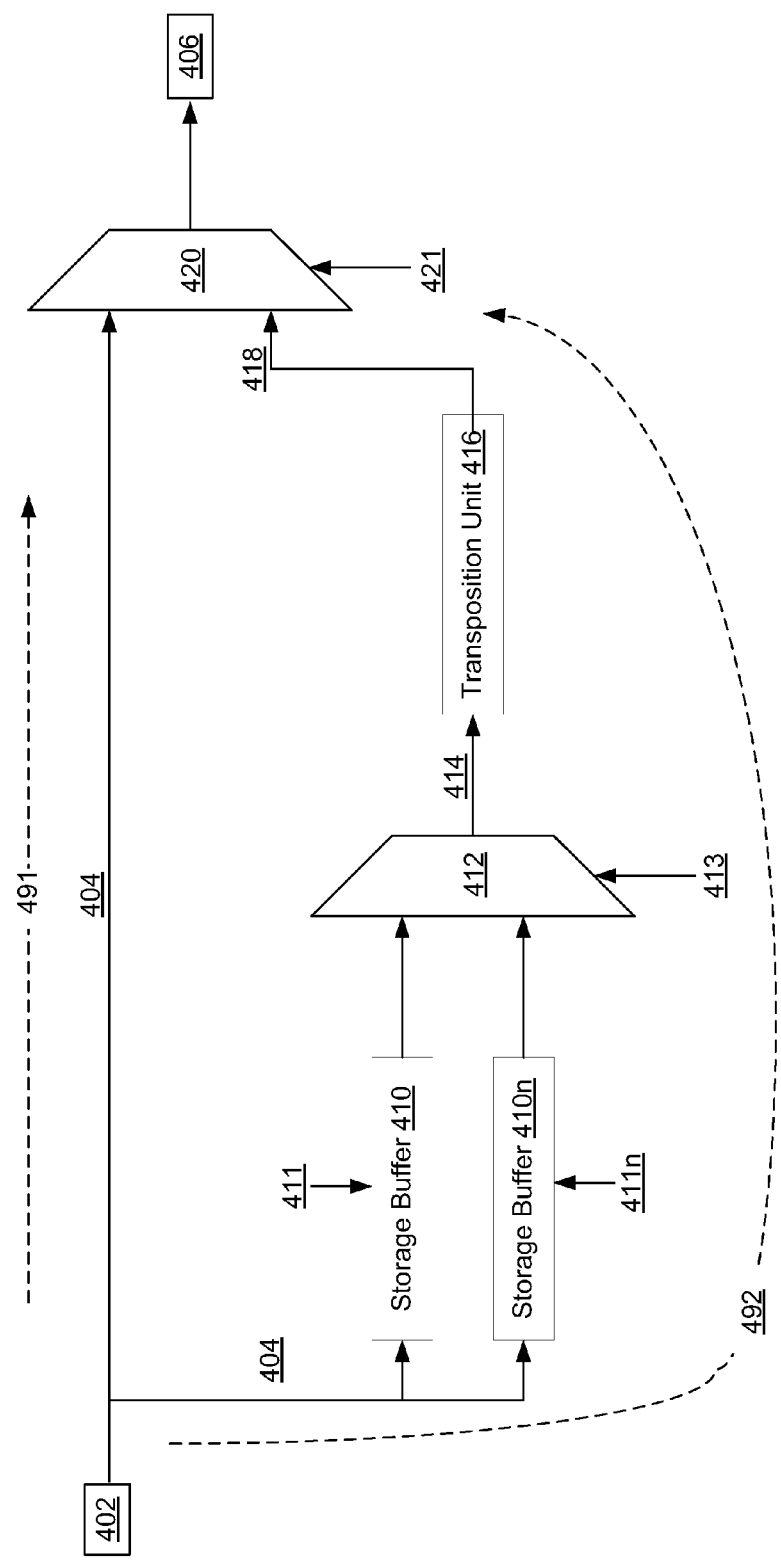

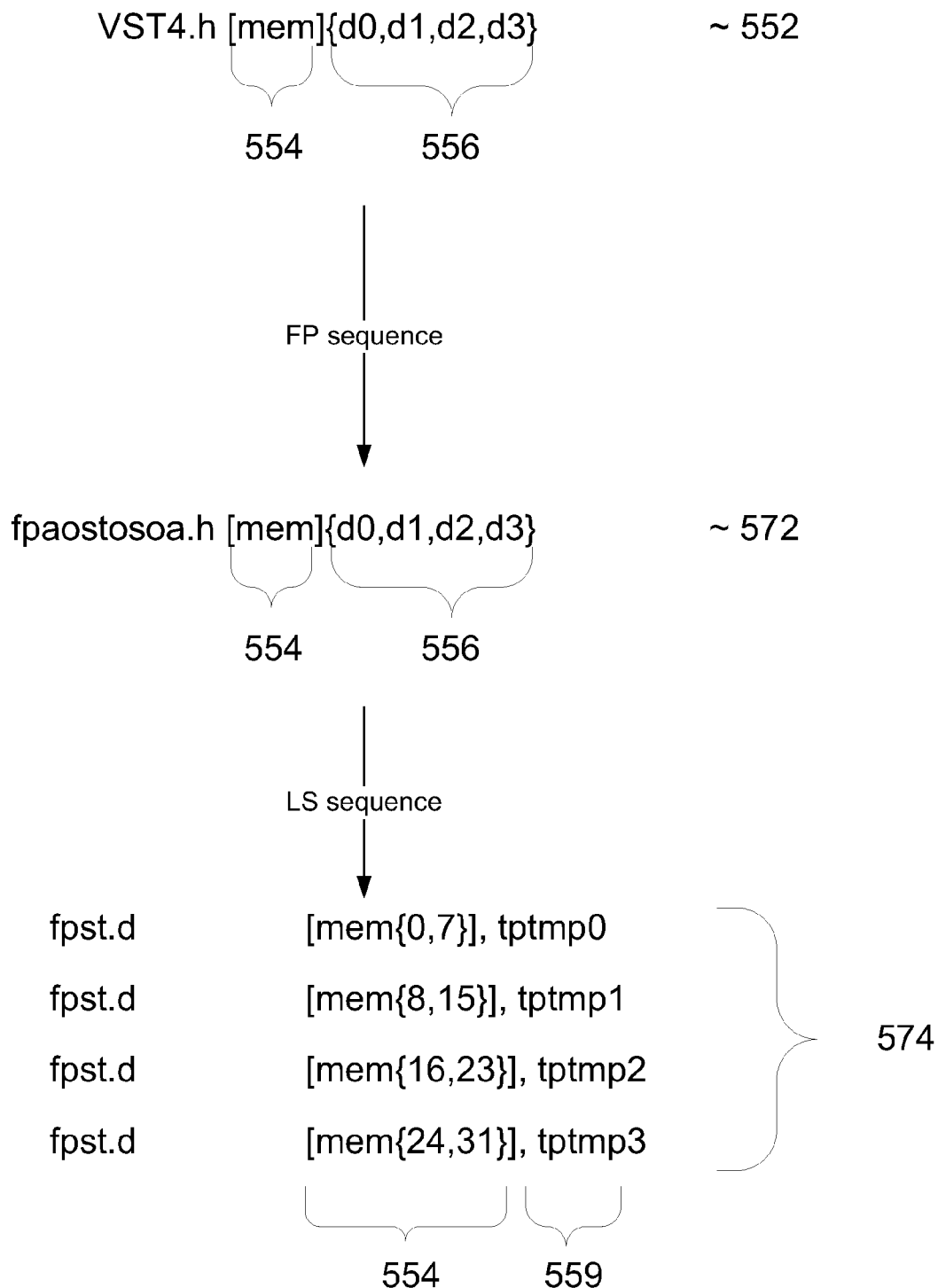

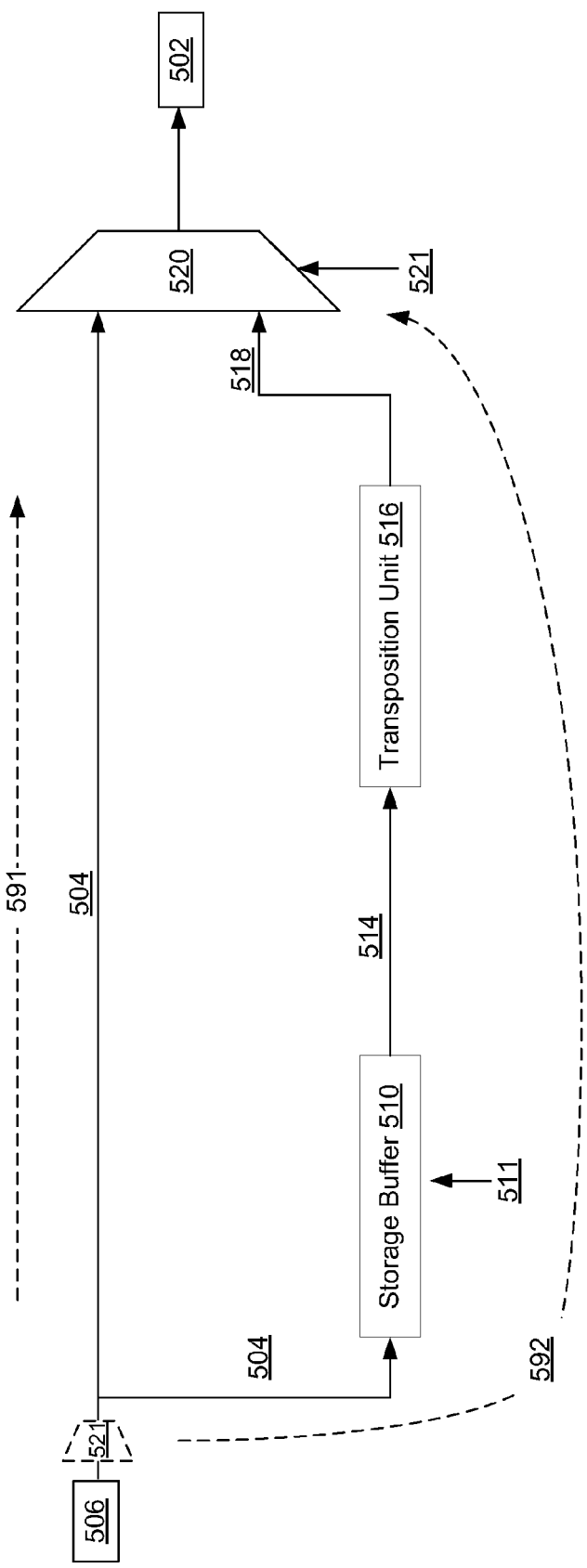

STREAMING MEMORY TRANSPOSE OPERATIONS

CROSS-REFERENCE TO RELATED APPLICATION

This application claims priority under 35 U.S.C. §119 to Provisional Patent Application Ser. No. 61/819,454, "A NOVEL METHOD OF STREAMING MEMORY TRANSPOSE OPERATIONS" filed on May 3, 2013. The subject matter of this earlier filed application is hereby incorporated by reference.

TECHNICAL FIELD

This description relates to integrated circuit architecture, and more specifically to the loading and storing of data from/to memory.

BACKGROUND

Generally, computer circuit or processor architectures include a series or number of functional unit blocks (FUBs) that perform specific operations or logical computations. Various examples of FUBs may include instruction fetch units (IFUs), instruction decode units (IDUs), instruction execution units, such as, load/store units (LSUs), floating point units (FPUs), arithmetic logic units (ALUs), etc.

Frequently, modern processors support single instruction multiple data (SIMD) instructions or similar instructions, that allows multiple pieces of data (e.g., an array of values, a vector of values, etc.) to be subjected to the same computation or operation as a result of a single instruction. Such operations are often, but not exclusively, used when processing multimedia data (e.g., video, graphics, audio, etc.). Often, such instructions require that the data be formatted according to a predefined scheme. Often the data format required by the execution unit (e.g., a SIMD FPU, etc.) may not correspond to the format employed when storing the data within in the memory of the computer. It is understood that the above is merely one illustrative example to which the disclosed subject matter is not limited.

SUMMARY

According to one general aspect, an apparatus may include a load unit, an execution unit, and a first and a second data path. The load unit may be configured to, in response to an instruction, load data from a memory and transmit the data to an execution unit, wherein the data includes a plurality of elements. The execution unit may be configured to perform a mathematical operation upon the data. The load unit may be configured to transmit the data to the execution unit via either a first data path configured to communicate, without transposition, the data between the load unit and the execution unit, or a second data path configured to communicate, with transposition, the data between the load unit and the execution unit, wherein transposition includes dynamically distributing portions of the data amongst the plurality of elements according to the instruction.

According to another general aspect, an apparatus may include an execution unit, a store unit, and a transposing data path. The execution unit may be configured to provide a set of data, wherein the data includes a plurality of elements. The store unit may be configured to, in response to a store-transpose instruction, store the data to a memory. The transposing data path may be configured to communicate the data between the execution unit and a store unit such that an order of the elements is rearranged according to a store-transpose instruction. The transposing data path may include a buffer structure to collect the data prior to transposing the data, and a transposing unit configured to rearrange the order of the elements.

According to another general aspect, a method may include providing, by a first functional unit block, data in a first format. The method may also include determining if, the data is to be converted to a second format prior to being received by a second functional unit block. The method may include, if the data is to be converted to a second format prior to being received by a second functional unit block, storing the data in a storage buffer of a transposing data path, once the data has been stored in the storage buffer, transposing the data to a second format, and transmitting the data in the second format to the second functional unit block.

According to yet another general aspect, a system may include a memory, a system bus, and a processor. The memory may be configured to store at least one set of data, wherein the data includes a plurality of elements. The system bus may be configured to communicatively couple the memory. The processor may be configured to perform an operation upon the data according to an instruction. The processor may include: a load unit, a first and a second data path, and an execution unit. The load unit may be configured to, in response to the instruction, load the data from the memory and transmit the data to an execution unit via either a first load data path or a second load data path. The first load data path may be configured to transmit, without transposition, the data between the load unit and the execution unit. The second load data path may be configured to generate, based upon the data, a transposed data and transmit the transposed data to the execution unit, wherein the transposed data include a version of the data in which an order of the data has been rearranged. The execution unit may be configured to perform the operation upon the data.

The details of one or more implementations are set forth in the accompanying drawings and the description below. Other features will be apparent from the description and drawings, and from the claims.

A system and/or method for processing data, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 3a is a diagram of an example embodiment of a series of instructions in accordance with a traditional system.

FIG. 4 is a block diagram of an example embodiment of a system in accordance with the disclosed subject matter.

FIG. 5b is a diagram of an example embodiment of a series of instructions in accordance with the disclosed subject matter.

FIG. 5c is a block diagram of an example embodiment of a system in accordance with the disclosed subject matter.

Like reference symbols in the various drawings indicate like elements.

DETAILED DESCRIPTION

Figure 2A:
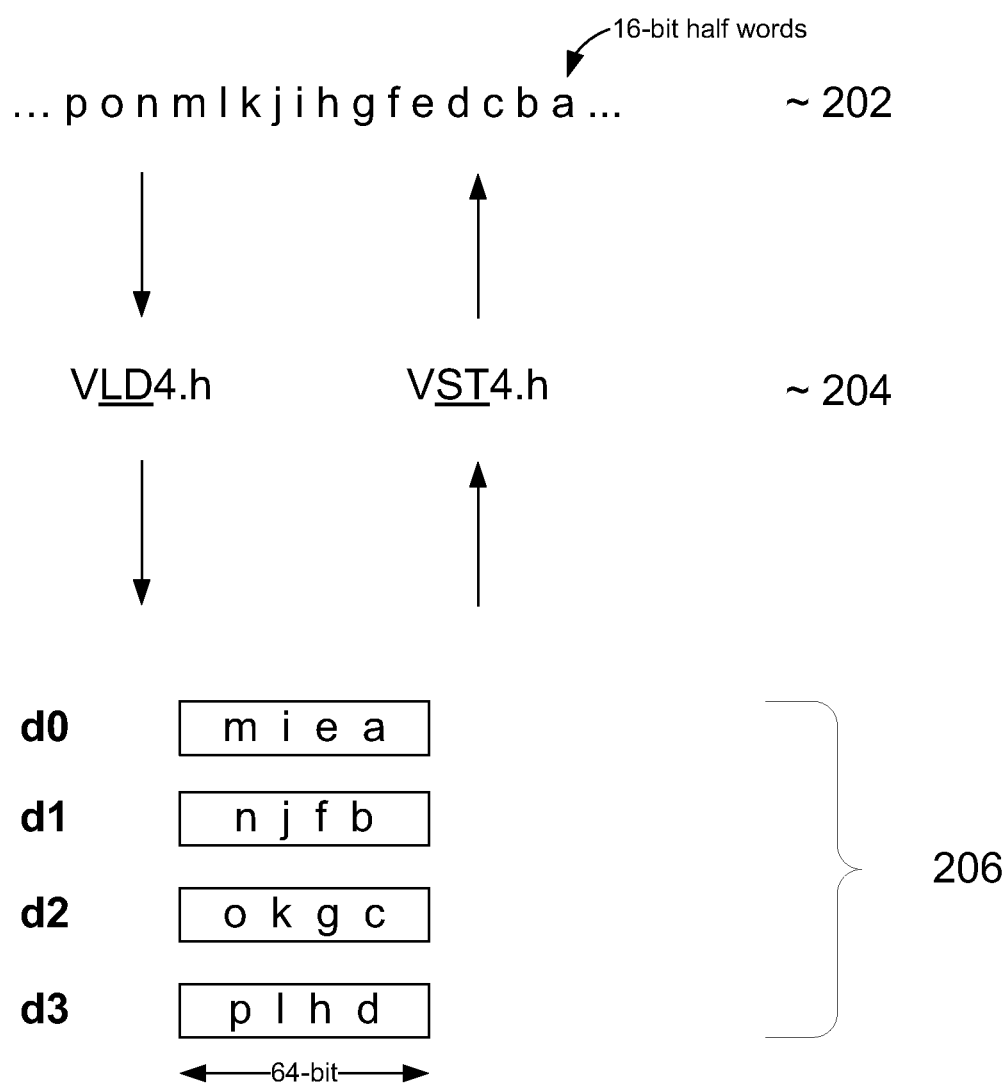
FIG. 2a is a diagram of an example embodiment of a memory system in accordance with the disclosed subject matter.

FIG. 1 is a block diagram of a system 100 for processing data. In various embodiments, the system 100 may include processor 101 and a memory 190. In various embodiments, the processor 101 may include a central processing unit (CPU), a co-processing integrated circuit (IC), a chipset component, or other form of logic circuit. In some embodiments, the system 100 may include one or more functional unit blocks (FUBs) or combinational logic blocks (CLBs), such as those described below.

In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

In the illustrated embodiment, a simplified pipeline or computer architecture is shown. It is understood that the below is merely one illustrative example to which the disclosed subject matter is not limited.

In the illustrated embodiment, the processor 101 may include a number of FUBs or CLBs. In the illustrated embodiment, the processor may include an instruction fetch unit (IFU) 102, an instruction decode unit (IDU) 104, a load/store unit (LSU) 106, and at least one processor or execution unit 108. In some embodiments, the processor 101 may also include a memory system that may in turn include a level-1 (L1) instruction cache 114, an L1 data cache 116, a level 2 memory system 112, and a memory interface 110. It is understood that the above are merely a few illustrative examples to which the disclosed subject matter is not limited.

In some embodiments, the instruction fetch unit (IFU) 102 may be configured to fetch or retrieve an assembly instruction (e.g., Add, Load, Store, Jump, etc.). In various embodiments, the IFU 102 may retrieve the instruction according to an instruction pointer from an instruction cache, such as the level-1 instruction (L1-I) cache 114. In such an embodiment, the L1-I cache 114 may include a plurality of memory elements and be configured to temporarily store a plurality of instructions for quick retrieval by the IFU 102 or other FUBs.

In the illustrated embodiment, the fetched instruction may be passed to the instruction decode unit (IDU) 104. In various embodiments, the IDU 104 may be configured to determine what operation(s) need to be performed in response to the instruction. For example, some instructions may require a branch prediction, others a floating point computation, yet others the retrieval or loading of data from a memory. For this example and the illustrated embodiment, the instructions considered and described in detail are those that perform a load or read operation from memory 190 (either directly or indirectly via a cache), instructions that perform a store or write operation to memory 190 (either directly or indirectly via a cache), and instructions that cause an execution unit 108 to perform a mathematical or logical operation on the data.

It is understood that the above are merely a few illustrative examples to which the disclosed subject matter is not limited.

In the illustrated embodiment, an instruction that requires a load or store operation may be transferred to the load/store unit (LSU) 106. In various embodiments, the system 100 may include separate load units and separate store units. In the illustrated embodiment, the LSU 106 may access (read/write) data from a level-1 data (L1-D) cache 116.

It is understood that while all the information in the memory 190 (and copies thereof) may be considered "data", in the parlance of computer architecture and in this context, the term "instruction" refers to information that causes the processor 101 to perform some logical operation or mathematical computation. Conversely, in this context, the term "data" refers to information that is operated upon or used as an input to or is the result of a mathematical computation. For example, information representing "ADD M0,M1,M2" may be considered an instruction that causes the machine to add (a mathematical operation) the value of memory location 0 (M0) to the value of memory location 1 (M1), and deposit the result in memory location 2 (M2). "ADD" being the instruction's operation and M0, M1, and M2 being the instruction's operands. The values of input memory locations 0 and 1 (e.g., the numbers 1234 and 7890) and the resultant output stored at memory location 2 (e.g., the number 9124) would be referred to as the "data".

As is understood, generally in computer architecture memory is arranged in a series hierarchical tiered memory structures. In the illustrated embodiment, the memory 190 may include all of the data, instructions, and information within the system 100 and may include system level random access memory (RAM), hard drives, other mass storage devices, etc. or a combination thereof. For purposes the illustrated embodiment, the memory 190 may be considered the slowest memory in the system 100. This memory 190 may be accessed (written to or read from, etc.) by the processor 101 via the memory interface 110. This information may be temporarily stored within the level-2 (L2) memory system 112. In some embodiments, the L2 Memory 112 may be smaller and faster than the memory 190, and in the illustrated embodiment, may include a combined instruction and data cache. From the L2 memory 112 a sub-set of the instructions may be stored within the L1-I cache 114 and a sub-set of the data may be stored within the L1-D cache 116. In various embodiments, the L1 caches 114 and 116 may be smaller and faster than the L2 memory or cache 112. It is understood that the above are merely a few illustrative examples to which the disclosed subject matter is not limited.

In the illustrated embodiment, various instructions (e.g., SIMD instructions, etc.) may result in the processor 101 loading data from the memory (memory 190 or caches 112 or 116, etc.) and then storing the data in registers (e.g. register 125, etc.) of a specific processing or execution unit 108 or a general purpose register (not shown). Conversely, some instructions may cause the data stored in various registers of an execution unit 108 or general purpose registers to be stored back in memory. These instructions are generally referred to as LOAD (LD) or STORE (ST) instructions.

In some embodiments and described below in reference to FIGS. 2a and 2b, the data may include an array, a vector, or more generally a plurality of elements. In various embodiments, the data may be stored in the memory or cache 116 in a format or manner than is not desirable to storage within the registers 125 or execution unit 108. In such an embodiment, the LSU 106 or the execution unit 108 may be configured to re-format or transpose the data during the performance of the load or store instruction, as described below.

In the illustrated embodiment, the processor 101 may include a processor or execution unit 108. In various embodiments, the processor unit 108 may include one or more registers 125 and one or more execution or computation units or sub-units (not shown). For example, some processor units 108 may be sufficiently complex that the include their own respective instruction or sub-instruction decode sub-units configured to take a complex instruction and sub-divide the instruction into a plurality of smaller micro or sub-instructions, as described below in reference to FIG. 3a. Likewise, in various embodiments, the load/store unit 106 may also include an instruction decode sub-unit (not shown), as described below in reference to FIG. 3b.

In some embodiments, the processor unit 108 may include a load (and/or a store) queue configured to store data for processing by the execution or computation unit 108. For example, for SIMD instructions the large amount of data (compared to single-instruction single data (SISD) instructions) may be stored within the load queue for entry into the registers 125 or processing by the execution unit 108.

FIG. 2a is a diagram of an example embodiment of a memory system 200 in accordance with the disclosed subject matter. In one embodiment, the memory system 200 may include a stream or group of data 202 (illustrated by the characters a, b, c, d, e, f, g, h, i, j, k, l, m, n, and p, etc.).

In various embodiments, an instruction set architecture or computer architecture may support one or more instructions 204 that load a block or set of data (e.g., data 202) from memory, transpose or re-format this data, and store or load the transposed data into a set of registers. Likewise, such an instruction set may support a set of instructions 204 that perform the inverse function, i.e., read data from a set of registers, transpose this data and then store the transposed data to memory.

In various embodiments, these instructions 204 may be used in video and audio processing where memory holds information in an array of structures (AOS) format but where a SIMD machine or execution unit desires data in a structures-of-arrays (SOA) format. As such, during the load or store instruction the re-formatting or transposition of portions of the data 202 is desirable.

In various embodiments, the set of instructions 204 may include instructions that support arrays or vectors of various sizes (e.g., 2-element arrays, 3-element arrays, 4-element arrays, etc.). Likewise, the instructions that support data in which each element is of various sizes or number of bits: e.g., 8-bits, 16-bits, 32-bits, 64-bits. In various embodiments, these bit-widths may be respectively defined as: 1 byte, 1 half-word, 1 word, 1 double word, etc. It is understood that the above are merely a few illustrative examples to which the disclosed subject matter is not limited.

In the illustrated embodiment, the instructions 204 are represented by a 4-element vector load of 1 16-bit half word per element (VLD4.h) and a 4-element vector store of 1 half word per element (VST4.h). It is understood that the above is merely one illustrative example to which the disclosed subject matter is not limited.

In the illustrated embodiment, when the VLD4.h instruction is executed the data 202 is placed into 4 registers 206 (d0, d1, d2, and d3). As described above, the data 202 is transposed to fulfill the formatting requirements of the registers 206.

In the illustrated embodiment, when performing the VLD4.h instruction the first 16-bits of the data 202 is placed in the first register d0, the second 16-bits of the data 202 is placed in the second register d1, and so on. In such an embodiment, the register d0 includes the value "miea". The register d1 includes "njfb", the register d2 includes "okgc" and the register d3 includes the value "plhd". Conversely, when the instruction VST4.w is executed the values in the registers 206 are inversely transposed or rearranged and the data 202 (ordered "p-a") is written to the memory.

Figure 2B:
FIG. 2b is a diagram of an example embodiment of a memory system in accordance with the disclosed subject matter.

FIG. 2b is a diagram of an example embodiment of a memory system 250 in accordance with the disclosed subject matter. In the illustrated embodiment, a less abstract example is given in which the data is an 8-bit color value for a pixel. The pixel data 252 may be stored within main memory (or a cached version thereof) but may be loaded into a SIMD execution unit's registers for processing. It is understood that the illustrated is merely one illustrative example to which the disclosed subject matter is not limited.

In the illustrated embodiment, the data 252 includes a Red-Green-Blue (RGB) pixel value array having 8-bits of data or information per color. This data 252 is stored within memory locations m0, m1, and m2. As can be seen the Red (R), Green (G) and Blue (B) bit values are each stored next to one another (i.e., by bit, not color).

In the illustrated embodiment, when a VLD3.8 instruction (load 3 elements of 8 bits each) is executed the data 252 is transposed into three registers 254 (d0, d1, d2). As can be seen each register stores the bit values for a specific color (e.g., d0 stores Red, d1 stores Green, etc.), such that the data array is stored by color, and no longer by bit.

Likewise, when the data is being stored from the execution registers 254 (d0, d1, d2) to the main memory 252 (m0, m1, m2), the data may be re-transposed or re-arranged into the original format (e.g., by bit, instead of color).

FIG. 3a is a diagram of an example embodiment of a series of instructions 300 in accordance with a traditional system. In various embodiments, a processor (e.g., processor 101 of FIG. 1, etc.) may be configured to execute a complex instruction (e.g., VLD4.w, etc.) as a series of smaller micro or sub-instructions. FIG. 3a. illustrates how a traditional system may have executed a load-transpose instruction 302 (e.g.,. VLD4.h). In the illustrated embodiment, the example still shows a transpose instruction where the element size is a 16-bit half word; however, the loads are *.d because that is the destination register width.

In the illustrated embodiment, the load-transpose instruction 302 may include a register section 304 detailing which destination registers to use (e.g., registers d0, d1, d2, and d3) and a data section 306 detailing at which memory location the data is stored (e.g., memory locations 0-31).

Traditionally, in order to perform instruction 302 the processor would have generated a series of sub-instructions 312. Traditionally the sub-instructions would have caused the processor to: load sub-portions 324 of the accessed data into a buffer or temporary registers 322; perform the transposition via an existing portion of an execution unit (e.g., a shuffle unit common in most floating-point units, etc.) with data read from the buffer/temporary registers 322, and then write the transposed data to the destination architectural registers 304. In the illustrated embodiment, this may have been done via eight sub-instructions 312: four sub-instructions 314 to load the data sub-portions 324 into the temporary registers 322, and four sub-instructions 316 to transpose the data 306 and load the transposed result into the architectural registers 304.

In such an embodiment, these sub-instructions 312 may result in the floating point unit (FPU) being utilized for eight clock cycles as the data is read-in or loaded and then the shuffle unit (or other sub-unit) of the FPU is utilized for purposes of transposition. During four of these cycles no other operation or instruction may make use of the transposition unit (e.g., the shuffle unit), as it is being used by the load-transpose instruction 302. Also, this results in eight registers of the FPU (or other unit) being used to store two copies of the data 306, as the sub-instructions 312 make use of the four destination registers 304 plus four temporary registers 322.

Figure 3B:
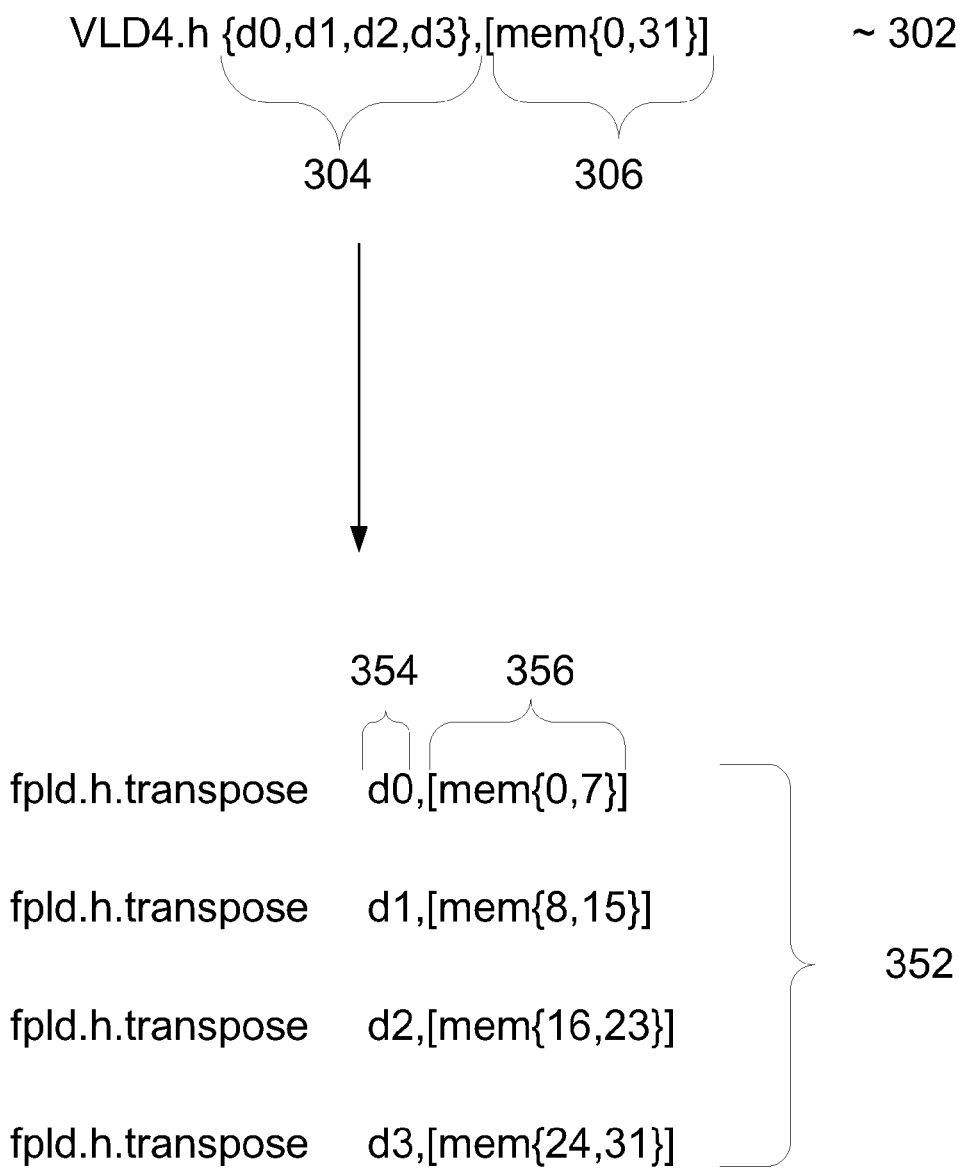
FIG. 3b is a diagram of an example embodiment of a series of instructions in accordance with the disclosed subject matter.

FIG. 3b is a diagram of an example embodiment of a series of instructions 301 in accordance with the disclosed subject matter. Again the load-transpose instruction 302 is used for illustrative purposes. The instruction 302 again targets the destination registers 304 and uses the data stored at memory location 306.

However, in the illustrated embodiment, the processor may make use of the disclosed subject matter that includes dedicated or at least partially dedicated hardware or logic devices to perform the load-transpose instruction 302 (e.g., the circuit 400 of FIG. 4, etc.). In some embodiments, this may occur without the aid of an existing execution unit. For example, unlike the set of instructions 300 of FIG. 3a the FPU may not need to be used for a number of cycles (e.g., 8 cycles, etc.) to perform the load-transpose instruction. It is understood that the above is merely one illustrative example to which the disclosed subject matter is not limited.

In the illustrated embodiment, the instruction 302 may result in four sub-instructions 352 (fpld.h.transpose). In such an embodiment, each instruction may include or be associated with a tag 354 that indicates a destination register (e.g., d0, d1, etc.) where the transposed data will be stored. Also, the larger data 306 (e.g., 32-bits of data) may be copied to a buffer via a number of sub-portions 356 (e.g., 4 sub-portions of 8-bits, etc.). In such an embodiment, the four sub-instructions taken together may include or indicate the information detailing the four destination registers 304 and all the bits of the data 306 that were originally present in the original instruction 302.

In such an embodiment, by using dedicated or at least partially dedicated hardware or logic devices (as illustrated by FIG. 4), the load-transpose instruction 302 may be performed without occupying an execution unit (e.g., the shuffle unit of an FPU, etc.) and without making use of temporary registers (and thus preventing those register's use by other instructions). In various embodiments, the load-transpose instruction 302 may be performed in less clock cycles, compared to the traditional technique (e.g., 4 cycles for sub-instructions 352 versus 8 cycles for sub-instructions 312). It is understood that the above are merely a few illustrative examples to which the disclosed subject matter is not limited.

FIG. 4 is a block diagram of an example embodiment of a system 400 in accordance with the disclosed subject matter. In the illustrated embodiment, data may be provided via an input signal or bus. In various embodiments, the input bus may be provided or be the output of an input FUB or CLB 402 such as a load/store unit (LSU). In the illustrated embodiment, the data may the provided to an output signal or bus. In such an embodiment, the output bus may be provided to or be the input of an output FUB or CLB 406, such as a floating-point unit (FPU), SIMD unit, or other execution unit, etc.

In various embodiments, the system 400 may include a plurality of data paths. In this context, a "data path" may include a bus or signal conduits (e.g., metal wires, etc.) and possibly logical gates (e.g., AND gates, OR gates, etc.) or circuits (e.g., memories, repeaters, etc.) that are employed to transmit data from one FUB to another or within a FUB. In various embodiments, the data paths illustrated may be included by the input FUB 402, the output FUB 406, or a combination thereof.

In the illustrated embodiment, the system 400 may include two data paths 491 and 492. In one embodiment, the first data path 491 may include a connection that communicates or transmits the data signal 404 from the LSU 402 to the execution unit 406. In the illustrated embodiment, the first data path 491 may transmit this signal 404 without transposition. In various embodiments, this first data path 491 may be employed for load operations that do not involve re-formatting the data (e.g., a non-vector load instruction, etc.). In some embodiments, the first data path 491 may be considered the typical or "normal" load bus between the LSU 402 and the various execution units 406. It is understood that the above is merely one illustrative example to which the disclosed subject matter is not limited.

In the illustrated embodiment, the system 400 may include a second data path 492. In various embodiments, the second data path 492 may be configured to communicate or transmit the data signal 404 or the information include therein between the LSU 402 and the execution unit 406. However, unlike the first data path 491, the second data path 492 may be configured to transpose or re-format the data signal 404 en route. In such an embodiment, the signal received by the execution unit 406 may be the transposed or re-formatted data signal 418. In some embodiments, the second data path 492 may be referred to as a transposing data path, whereas the first data path 491 may be referred to as a non-transposing data path.

In the illustrated embodiment, the system 400 and more specifically the second data path 492 may include one or more storage buffers 410 and a transposition unit 416. In various embodiments, the storage buffer 410 may be configured to temporarily store the data signal 404 or portions thereof. In such an embodiment, if a load-transpose instruction (e.g., VLD4.h, etc.) or sub-instruction (e.g., fpld.h.transpose, etc.) is detected the data signal 404 may be loaded into or stored by the storage buffer 410 or a portion thereof. In some embodiments, this may involve the use of an enable signal 411. In various embodiments in which a load-transpose instruction results in multiple sub-instructions, the storage buffer 410 may be configured to latch or store various portions of the data signal 404 multiple times until the entire set of data is within the storage buffer 410. This may occur as each sub-instruction provides only a portion (e.g., 64 bits, etc.) of the total (e.g., 256-bit) data.

In the illustrated embodiment, the transposition unit 416 may be configured to rearrange, re-format or transpose the data stored within the storage buffer 410 (input as signal 414) according to the load-transpose instruction. For example, in various embodiments, the transposition unit 416 may be configured to generate the transposed data such as or similarly to that illustrated by FIGS. 2a and 2b. It is understood that the above are merely a few illustrative examples to which the disclosed subject matter is not limited. In various embodiments, the transposition unit 416 may be configured to perform the transposition or re-formatting once the entire data set has been stored in the storage buffer 410.

In some embodiments, the transposition unit 416 may be similar to preexisting units or sub-units of various execution units 406 (e.g., the shuffle unit of an FPU, etc.). However, in various embodiments, the transposition unit 416 may be a dedicated FUB or CLB that is not used by an execution unit to perform a mathematical operation or execute an instruction. Further, as the transposition unit 416 may be configured to perform a specialized purpose or function, the logic and circuitry of the unit may be optimized for that role. In such an embodiment, the transposition unit 416 may be relatively small as it may include mostly wires and multiplexers (MUXs). It is understood that the above is merely one illustrative example to which the disclosed subject matter is not limited.

In another embodiment, the second data path 492 or an additional data path (not shown) may include more than one storage buffer (e.g., storage buffer 410n and enable signal 411n). In such an embodiment, the operations performed by the second data path 492 (e.g., temporary storage, and transposition, etc.) may be pipelined. In such an embodiment, if the first storage buffer 410 is full, the transposition unit 416 may process or transpose that first set of data, while the second storage buffer 410n is filling up or storing a second set of data. In such an embodiment, the throughput of the second data path 492 may be increased.

In the illustrated embodiment, a multiplexer 412 may be configured to determine which set of data is provided to the transposition unit 416 for processing. In various embodiments, this may include the use of an enable or buffer selection signal 413. In another embodiment, more than two storage buffers 410 may be employed. Further, in yet another embodiment, a plurality of transposition units 416 may be included and employed. In some embodiments, each transposition unit 416 may be identical. In other embodiments, one or more of the plurality of transposition units 416 may preform different re-formatting operations.

In the illustrated embodiment, the transposition unit 416 may produce or generate the transposed data signal 418. In various embodiments, this may re-join the first data path 491. In another embodiment, the transposed data signal 418 may remain separated from the first data path 491. In the illustrated embodiment, an arbitration unit 420 (illustrated as a multiplexer) may be configured to determine when the execution unit 406 receives the un-transposed data signal 404 as input and when the execution unit 406 receives the transposed data signal 418 as input. In various embodiments, this may be controlled by the arbitration signal 421.

In some embodiments, the LSU 402 may be configured to know (e.g., via cycle counting, etc.) when the data supplied via the second data path 492 is fully processed by the transposition unit 416 and is available for consumption by the execution unit 406. In such an embodiment, the LSU 402 may cause the arbitration signal 421 to switch the input to the execution unit 406 from the first data path 491 to the second data path 492. In such an embodiment, the transposed data signal 418 may be stored within the various registers of the execution unit 406.

As described above in reference to FIG. 3b, each sub-instruction may include a tag or indicator as to which register (e.g., d0, d1, etc.) of the execution unit 406 each portion of the transposed data 418 is to be stored. In various embodiments, each sub-instruction may cause a write to the respective execution unit 406 register from the transposition unit 416. In some embodiments, these writes may occur in series. In another embodiment, these writes may occur in parallel. It is understood that the above are merely a few illustrative examples to which the disclosed subject matter is not limited.

It is understood that while only one execution unit 406 is illustrated, a plurality of execution units 406 may exist. In such an embodiment, the load bus or arbitration unit 420 may be configured to route the transposed data signal 418 to the appropriate execution unit 406. In some embodiments, this may occur as a result of the specific instruction or sub-instruction (e.g., an FPU specific instruction, etc.), or as a result of the destination or target register (e.g., d0, d1, d2, etc.), or due to other factors. It is understood that the above are merely a few illustrative examples to which the disclosed subject matter is not limited.

Further, in various embodiments, the second data path 492 may include various low-power structures that allow for all or part of the second data path 492 to be powered-down or enter a low power state or mode when the second data path 492 is not being utilized. In some embodiments, this may include stopping a clock signal used to control the synchronous logic functions or gates of the second data path 492. It is understood that the above is merely one illustrative example to which the disclosed subject matter is not limited.

Figure 5A:
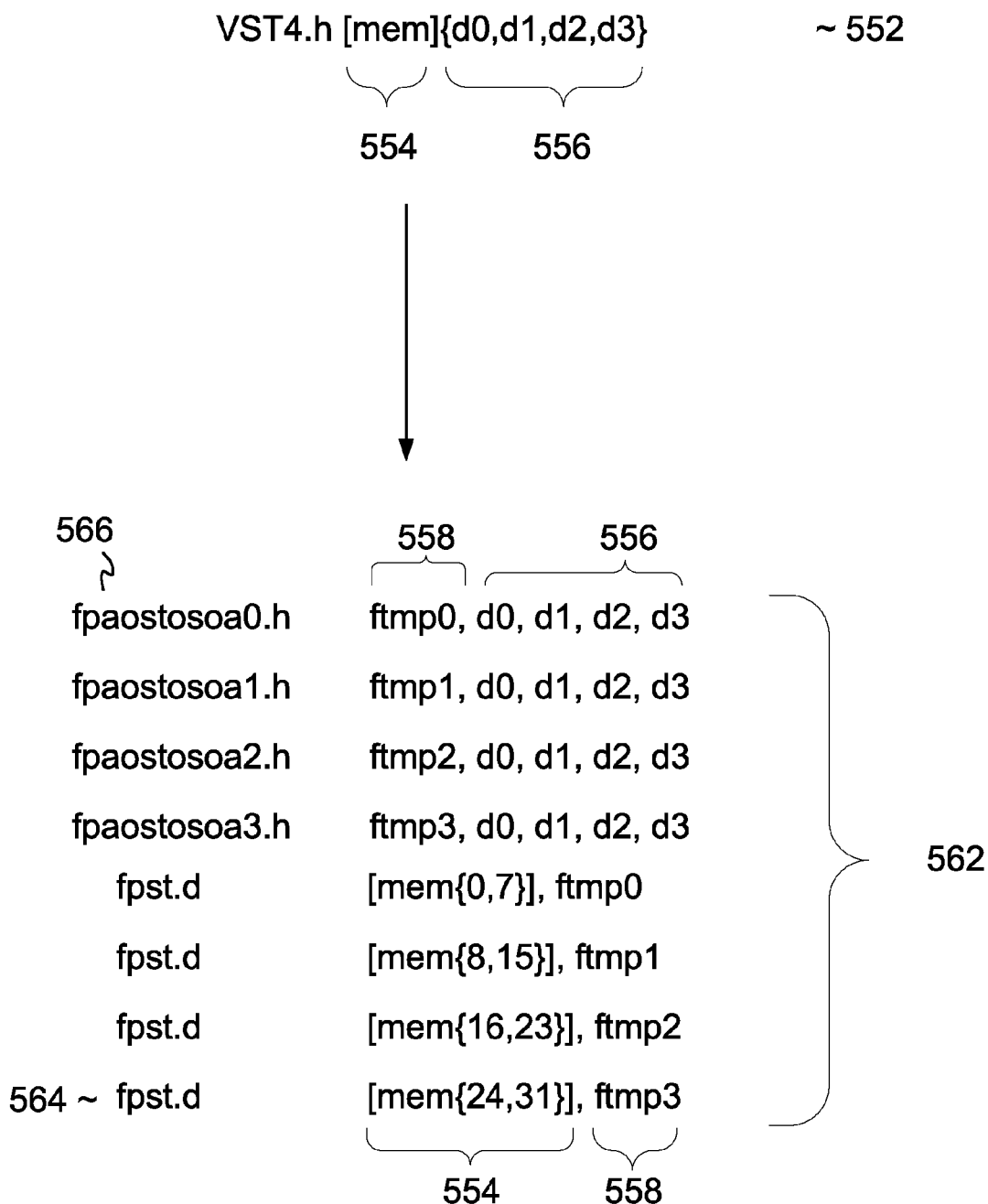
FIG. 5a is a diagram of an example embodiment of a series of instructions in accordance with a traditional system.

FIG. 5a is a diagram of an example embodiment of a series of instructions 550 in accordance with a traditional system. In various embodiments, a processor (e.g., processor 101 of FIG. 1, etc.) may be configured to execute a complex instruction (e.g., VST4.w, etc.) as a series of smaller micro or sub-instructions. FIG. 5a. illustrates how a traditional system may have executed a store-transpose instruction 552 (e.g.,. VST4.h). In the illustrated embodiment, the example still shows a transpose instruction where the element size is a 16-bit half word; however, the loads are *.d because that is the destination register width.

In the illustrated embodiment, the store-transpose instruction 552 may include a register section 556 detailing which source registers to use (e.g., registers d0, d1, d2, and d3) and a data section 554 detailing at which memory location the data is to be stored (e.g., memory locations 0-31).

Traditionally, in order to perform instruction 552 the processor would have generated a series of sub-instructions 562. Traditionally the sub-instructions would have caused the processor to: perform the transposition via an existing portion of an execution unit (e.g., a shuffle unit common in most floating-point units, etc.) with data read from the source registers 556 and stored in the buffer/temporary registers 558, and then write the transposed data to the destination memory 554. In the illustrated embodiment, this may have been done via eight sub-instructions 562: four sub-instructions 566 to transpose the data 556 and load the transposed result into the temporary registers 558, and four sub-instructions 564 to store the data sub-portions 554 from the temporary registers 558.

As described above, in such an embodiment, these sub-instructions 562 may result in the floating point unit (FPU) being utilized for eight clock cycles as the data is read-in or loaded and then the shuffle unit (or other sub-unit) of the FPU is utilized for purposes of transposition. During four of these cycles no other operation or instruction may make use of the transposition unit (e.g., the shuffle unit), as it is being used by the store-transpose instruction 552. Also, this results in eight registers of the FPU (or other unit) being used to store two copies of the data 556, as the sub-instructions 562 make use of the four source registers 556 plus four temporary registers 558.

FIG. 5b is a diagram of an example embodiment of a series of instructions 551 in accordance with the disclosed subject matter. Again the store-transpose instruction 552 is used for illustrative purposes. The instruction 552 again makes use of the source registers 556 and stores the data at memory location 554.

However, in the illustrated embodiment, the processor may make use of the disclosed subject matter that includes dedicated or at least partially dedicated hardware or logic devices to perform the store-transpose instruction 552 (e.g., the circuit 500 of FIG. 5c, etc.). In some embodiments, this may occur without the aid of an existing execution unit. For example, unlike the set of instructions 550 of FIG. 5a the FPU may not need to be used for a number of cycles (e.g., 8 cycles, etc.) to perform the store-transpose instruction. It is understood that the above is merely one illustrative example to which the disclosed subject matter is not limited.

In the illustrated embodiment, the instruction 552 may result in a single sub-instructions 572 (fpaostosoa.h) from the point of view of the FPU, and four sub-instructions 574 (fpst.d) from the point of view of the load-store unit (LSU). Likewise, in such an embodiment, the FPU may complete its sub-instruction 572 and move on to other operations, while the LSU is still executing its sub-instructions 574 or due to the delay in the dedicated transposition unit (e.g., the circuit 500 of FIG. 5c) may not have even started executing its sub-instructions 574.

In the illustrated embodiment, the FPU may execute its sub-instruction 572 and place the contents of the source registers 556 on the store bus or data path for ultimate storage in memory location 554. As described below in relation to FIG. 5c, the transposition unit or more generally the dedicated transposition data path may perform the transposition of the data previously stored in the source registers 556. Upon completion of the transposition, the transposition unit (or other circuit) may generate or cause to be generated the LSU sub-instructions 574. These LSU sub-instructions 574 may cause the now transposed data that is temporarily stored in the four transposition unit registers 599 (or elsewhere) to be placed in the memory locations 554. It is understood that the above is merely one illustrative example to which the disclosed subject matter is not limited.

FIG. 5c is a block diagram of an example embodiment of a system 500 in accordance with the disclosed subject matter. Unlike FIG. 4 that illustrates an embodiment of the load-transpose pipeline or data paths, FIG. 5c illustrates an embodiment of the store-transpose pipeline or data paths. In such an embodiment, once a set of data has been processed or generated by an execution unit 506 (e.g., an FPU, etc.) the data may be written or stored back within a memory. This may be done by the Load/Store Unit (LSU) 502. In various embodiments, the system 500 may be included by the LSU 502 or the store bus.

As described above, the store-transpose instruction may be converted or divided into one or more sub-instructions. For example, traditionally the instruction VST4.h [mem], {d0, d1, d2, d3} may result in a series of sub-instructions that make use of a number or temporary registers, and then use the shuffle sub-unit for transposition, before providing the transposed (or un-transposed, depending on your point of view) data to the LSU 502.

However, in the illustrated embodiment, with the use of the dedicated second data path 592 of FIG. 5c, the instruction VST4.h [mem], {d0, d1, d2, d3} may result in a single execution unit's sub-instruction (e.g., fpaostosoa.h [mem], {d0, d1, d2, d3}) that causes the contents of the registers d0, d1, d2, and d3 to be placed on the second data path 592 for processing before being given to the LSU 502. In such an embodiment, the execution unit 506 may be freed-up or no longer occupied with performing the transposition operation and temporary storage, similarly to that described above.

As described above, depending on the sub-instruction or other determining factor the data signal 504 may be output from the execution unit 506 may be placed on either the first data path 591 or the second data path 592.

In various embodiments, the second data path 592 may include a storage buffer 510 configured to temporarily store the data signal 504 or portions thereof. In the illustrated embodiment, the storing operation of the storage buffer 510 may be gated or controlled by the control signal 511.

In some embodiments, once the storage buffer 510 has been filled with the data 504, the transposition unit 516 may transpose or re-format the data. In such an embodiment, the transposition unit 516 may generate the transposed data 518.

In various embodiments, the second data path 592 or system 500 may include an arbitration unit 520 configured to dictate whether or not the LSU 502 receives input from either the first data path 591 or the second data path 592. In such an embodiment, the arbitration unit 520 may be controlled by the arbitration signal 521.

In various embodiments, basic or non-transposition store instructions that make use of the first data path 591 may result in a single LSU 502 sub-instruction (e.g., fpst.d [data], [memory address], etc.) for every corresponding execution unit 506 sub-instruction. In such an embodiment, every execution unit store op or sub-instruction and every corresponding LSU store op or sub-instruction may be associated or linked via a common tag.

However, in the case of transposition store instructions that make use of the second data path 592, the single execution unit store op or sub-instruction (e.g., fpaostosoa.h) may result in plurality of LSU store ops or sub-instructions (e.g., fpst.d). For example if the execution unit outputs data from four registers (e.g., d0, d1, etc.), four LSU store ops or sub-instructions may be created.

In one such embodiment, in order to associate the single execution unit store op or sub-instruction with the four (or other number) LSU store ops or sub-instructions, the reorder buffer (ROB) identifier (ID) of the instruction may be used or employed as the common tag or the basis thereof. In such an embodiment, if the ROB ID of the first LSU op (e.g., fpst.d) is known by (or is the same as the ROB ID of) the execution unit op (e.g., fpaostosoa.h), then the ROB IDs of the remaining associated LSU ops may be generated from that first ROB ID. In various embodiments, this may occur as they are numerical increments of the first one. In such an embodiment, this tag generation may be performed or done by the transposition unit 516 as it generates the four store packets or store portions of the transposed data 518. It is understood that the above is merely one illustrative example to which the disclosed subject matter is not limited.

In various embodiments, if the execution unit 506 does not support reading from the desired number of registers (e.g., only two registers may be read simultaneously but four registers are needed by the instruction, etc.), additional execution unit ops or sub-instructions may be generated. In such an embodiment, multiple sub-instructions may be used to fill or load the storage buffer 511. Again, in various embodiments, once the storage buffer 511 has been filled, or as filled as the instruction allows, the transposition unit 516 may process its contents.

In various embodiments, the second data path 592 may include a plurality of storage buffers 510 and/or transposition units 516, as described above. In some embodiments, an arbitration unit 521 may gate the execution unit 506's access to the store bus or data paths 591 and 592, or, stated another way, may gate or arbitrate the execution unit 506's access to the data or store bus that includes the data paths 591 and/or 592. In such an embodiment, the store bus may be shared amongst a plurality of execution units 506. It is understood that the above is merely one illustrative example to which the disclosed subject matter is not limited.

Figure 6:
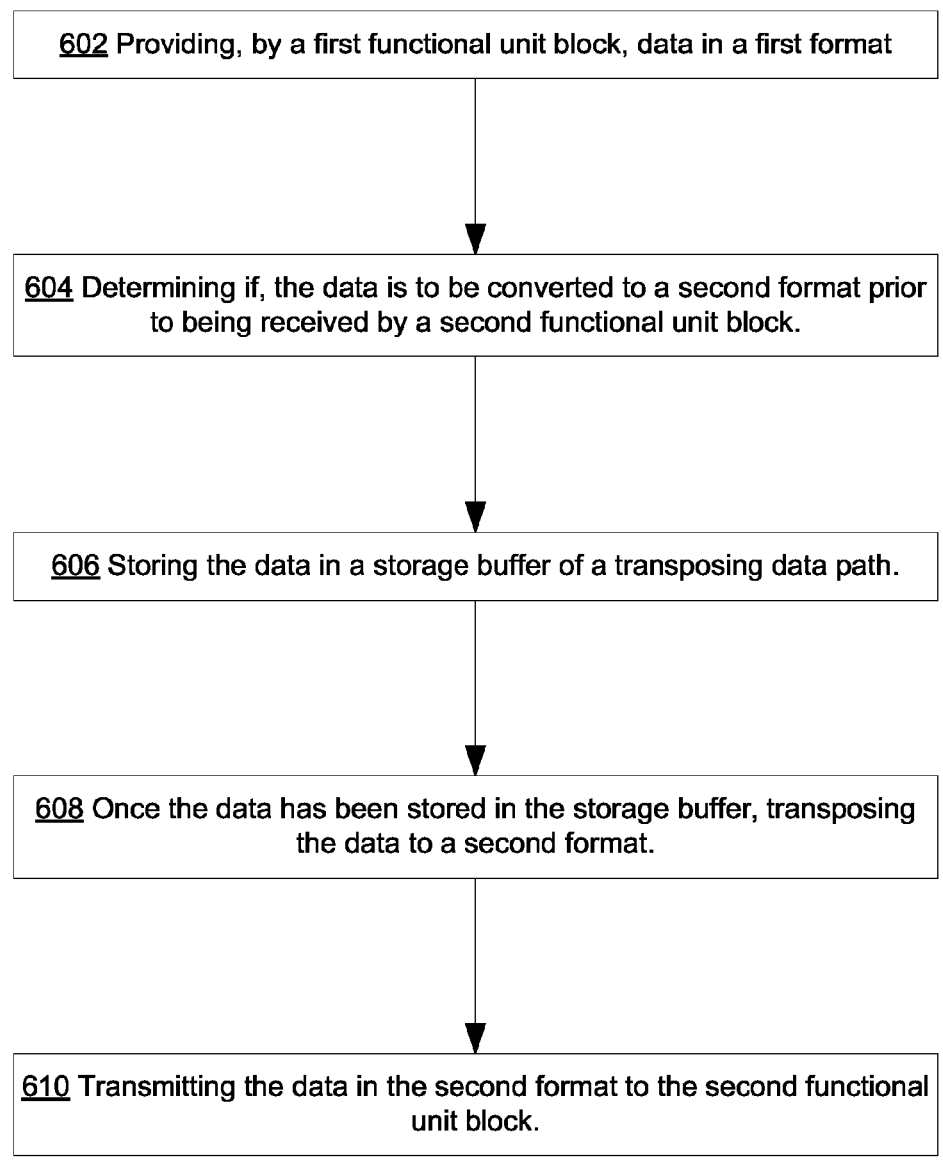
FIG. 6 is a flowchart of an example embodiment of a technique in accordance with the disclosed subject matter.

FIG. 6 is a flowchart of an example embodiment of a technique 600 in accordance with the disclosed subject matter. In various embodiments, the technique 600 may be used or produced by the systems such as those of FIGS. 1, 4 or 5. Furthermore, portions of technique 600 may be used or produced by the instructions or sub-instructions such as that of FIG. 3b, while portions of technique 600 may be used on or produce the data structures such as those of FIGS. 2a and/or 2b. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, data in a first format may be provided by a first functional unit block (FUB), as described above. In one embodiment, the first FUB may include a floating point unit (FPU), as described above. In another embodiment, the first FUB may include a load-store unit (LSU), as described above. In various embodiments, one or more of the action(s) illustrated by this Block may be performed by the apparatuses or systems of FIGS. 1, 4, 5c, or 7, the FUBs 106 or 108 of FIG. 1, the FUBs 402 or 406 of FIG. 4, the FUBs 506 or 502 of FIG. 5c, as described above.

Block 604 illustrates that, in one embodiment, a determination may be made as to whether the data is to be converted to a second format prior to being received by a second functional unit block, as described above. In one embodiment, the first FUB may include a floating point unit (FPU), as described above. In another embodiment, the first FUB may include a load-store unit (LSU), as described above. In various embodiments, this determination may be based upon an instruction executed by the apparatus (e.g., VLD4.h, VST4.h, etc.), as described above. In various embodiments, one or more of the action(s) illustrated by this Block may be performed by the apparatuses or systems of FIGS. 1, 4, 5c, or 7, the FUBs 106 or 108 of FIG. 1, the FUBs 402 or 406 of FIG. 4, the FUBs 506 or 502 of FIG. 5c, as described above.

Block 606 illustrates that, in one embodiment, the data may be stored in a storage buffer of a transposing data path, as described above. In some embodiments, storing may include generating, by the first functional unit block, a series of sub-instructions and executing each sub-instruction, as described above. In such an embodiment, each sub-instruction may be associated with a register of the second functional unit block and a portion of the data, and each sub-instruction when executed may cause the first functional unit block to copy the respective portion of the data to the storage buffer, as described above.

In one embodiment, the first unit block may store the data in a plurality of registers of the first functional unit block, each register storing a portion of the data, as described above. In such an embodiment, storing the data in the storage buffer may include copying, substantially simultaneously, a plurality of the portions of the data to the storage buffer, as described above. In another embodiment, the first functional unit block may be capable of performing an operation on a second data once the once the data has been stored in the storage buffer, as described above.

In various embodiments, one or more of the action(s) illustrated by this Block may be performed by the apparatuses or systems of FIGS. 1, 4, 5c, or 7, the storage buffers 410 or 410n of FIG. 4, the storage buffer 510 of FIG. 5c, as described above.

Block 608 illustrates that, in one embodiment, once the data has been stored in the storage buffer, the data may be transposed to a second format, as described above. In various embodiments, one or more of the action(s) illustrated by this Block may be performed by the apparatuses or systems of FIGS. 1, 4, 5c, or 7, the transposition unit 416 of FIG. 4, the transposition unit 516 of FIG. 5c, as described above.

Block 610 illustrates that, in one embodiment, the data in the second format may be transmitted to the second functional unit block, as described above. In various embodiments, transmitting may include arbitrating access to the second functional unit block between two pieces of data. The first piece of data being the data in the second format transmitted via the transposing data path and the second piece of data being a second set of data transmitted via a non-transposing data path, as described above. In another embodiment, transmitting may include writing portions of the data in the second format to the second functional unit blocks via a plurality of write sub-instructions, as described above. In various embodiments, one or more of the action(s) illustrated by this Block may be performed by the apparatuses or systems of FIGS. 1, 4, 5c, or 7, the transposition unit 416 or arbitration unit 420 of FIG. 4, the transposition unit 516 or arbitration unit 520 of FIG. 5c, as described above.

Figure 7:
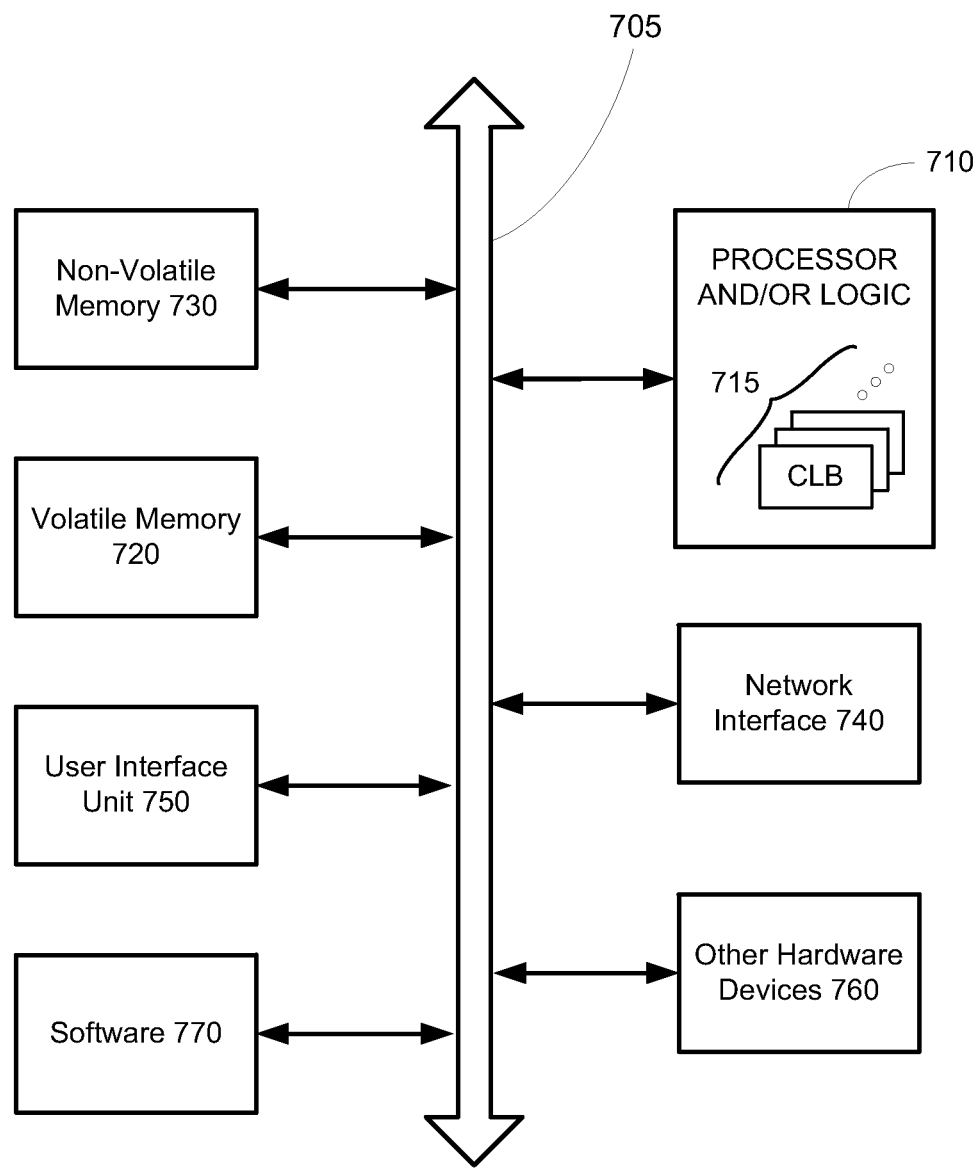
FIG. 7 is a schematic block diagram of an information processing system which may include devices formed according to principles of the disclosed subject matter.

FIG. 7 is a schematic block diagram of an information processing system 700 which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 700 may be used by a user (not shown).

The information processing system 700 according to the disclosed subject matter may further include a central processing unit (CPU), processor or logic 730. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM), etc.). The information processing system 700 according to the disclosed subject matter may further include a non-volatile memory 730 (e.g., a hard drive, an optical memory, a NAND or Flash memory, etc.). In some embodiments, either the volatile memory 720, the non-volatile memory 730, or a combination or portions thereof may be referred to as a "storage medium". In various embodiments, the memories 720 and/or 730 may be configured to store data in a semi-permanent or substantially permanent form.

In various embodiments, the information processing system 700 may include one or more network interfaces 740 configured to allow the information processing system 700 to be part of and communicate via a communications network.

Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 700 according to the disclosed subject matter may further include a user interface unit 750 (e.g., a display adapter, a haptic interface, a human interface device, etc.). In various embodiments, this user interface unit 750 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 700 may include one or more other hardware components or devices 760 (e.g., a display or monitor, a keyboard, a mouse, a camera, a fingerprint reader, a video processor, etc.). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the memories 720 and 730, the network interface 740, the user interface unit 750, and one or more hardware components 760. Data processed by the CPU 710 or data inputted from outside of the non-volatile memory 710 may be stored in either the non-volatile memory 710 or the volatile memory 740.

In various embodiments, the information processing system 700 may include or execute an one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740, etc.) of the information processing system 700. In such an embodiment, the information processing system 700 may include one or more native applications, which may be installed locally (e.g., within the non-volatile memory 730, etc.) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 710.

The semiconductor devices described above may be encapsulated using various packaging techniques. For example, semiconductor devices constructed according to principles of the present disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (S SOP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a load unit configured to, in response to an instruction, load data from a memory and transmit the data to an execution unit, wherein the data includes a plurality of elements;
   a first data path configured to communicate, without transposition, the data between the load unit and a execution unit;
   a second data path configured to communicate, with transposition, the data between the load unit and the execution unit, wherein transposition includes distributing portions of the data amongst the plurality of elements according to the instruction; and
   the execution unit configured to perform a mathematical operation upon the data; wherein the load unit is configured to transmit the data to the execution unit via either the first data path or the second data path;
   wherein the second data path comprises:
   a plurality of buffer memories, arranged in parallel, each configured to temporarily store respective data,
   a multiplexer configured to determine which data from the plurality of buffer memories is provided to a transposition unit, and
   the transposition unit configured to, based upon the instruction, move portions of the data amongst the plurality of elements;
   wherein the first data path is configured to transmit a first set of data between the load unit and the execution unit while the second data path is transmitting, in a parallel fashion, a second set of data between the load unit and the execution unit.

2. The apparatus of claim 1,
   wherein the plurality of buffer memories is configured to temporarily store a plurality of respective data substantially simultaneously.

3. The apparatus of claim 1, wherein the data includes a plurality of elements each element having a uniform bit length.

4. The apparatus of claim 1, wherein the instruction is converted into a plurality of sub-instructions; and
   wherein each of the plurality of elements is associated with a respective one of the plurality of sub-instructions.

5. The apparatus of claim 4, wherein each sub-instruction includes:
   a portion of the data, and
   a tag associated with a respective destination register, and wherein the tag is not directly associated with the portion of the data; and
   wherein the second data path includes a transposition unit configured to transpose the data into transposed data and, for each sub-instruction, associate the respective tag with a respective portion of the transposed data, wherein each respective tag is directly associated with a corresponding portion of the transposed data.

6. The apparatus of claim 1, wherein the load unit is configured to load, in turn, each element of data into a buffer memory of the second data path;
   wherein the second data path is configured to, once all elements of the data have been loaded into the buffer memory, convert the data into a transposed data, wherein the transposed data includes a plurality of elements;
   wherein execution unit includes a plurality of memory registers; and
   wherein the second data path is configured to store each element of the transposed data in a respective memory register of the execution unit.

7. A system comprising:
   a memory configured to store at least one set of data, wherein the data includes a plurality of elements;
   a system bus configured to communicatively couple the memory and a processor; and
   the processor configured to perform an operation upon the data according to an instruction;
   wherein the processor includes:
   a load unit configured to, in response to the instruction, load the data from the memory and transmit the data to an execution unit via either a first load data path or a second load data path,
   the first load data path configured to transmit, without transposition, the data between the load unit and the execution unit,
   the second load data path configured to generate, based upon the data, a transposed data and transmit the transposed data to the execution unit, wherein the transposed data includes a version of the data in which an order of the data has been rearranged
   wherein the second load data path comprises:
   a plurality of buffer memories each configured to temporarily store respective data,
   a multiplexer configured to determine which data from a the plurality of buffer memories is provided to a transposition unit, and
   the transposition unit configured to, based upon the instruction, move portions of the data amongst the plurality of elements, and
   the execution unit configured to perform the operation upon the data; and
   wherein the first load data path is configured to transmit a first set of data between the load unit and the execution unit while the second load data path is transmitting, in a parallel fashion, a second set of data between the load unit and the execution unit.

8. The system of claim 7, wherein the data is formatted as an array of structures and the transposed data is formatted as a structure of arrays.

9. The system of claim 7, wherein the execution unit is configured to as part of performing the operation upon the data, generate a processed data based upon either the transposed data or the data, and
   transmit the processed data to a store unit via either a first store data path or a second store data path; and
   wherein the processor further includes:
   a first store data path configured to transmit, without transposition, the processed data between the execution unit and a store unit,
   a second store data path configured to generate, based upon the processed data, a transposed processed data and transmit the transposed processed data to the store unit, wherein the transposed data include a version of the processed data in which an order of the processed data has been rearranged, and
   a store unit configured to store either the processed data or the transposed processed data within the memory.

10. The system of claim 9, wherein the processor includes a load-store unit that includes the load unit and the store unit.

11. The system of claim 9, wherein the load unit includes at least a portion of the second load data path, and wherein the store unit includes at least a portion of the second store data path.

12. The system of claim 7, wherein the processor further includes a load bus configured to transmit data between the load unit and at least one execution unit;

wherein the load bus includes the first load data path and the second load data path; and wherein the first and second load data paths control the load bus according to an arbitration scheme.

* * * * *